US012126412B2

(12) United States Patent
Girnyk et al.

(10) Patent No.: US 12,126,412 B2
(45) Date of Patent: Oct. 22, 2024

(54) ORIENTATION-ROBUST OPERATION OF TRI-POLARIZED ANTENNA ARRAY

(71) Applicant: Telefonaktiebolaget LM Ericsson (publ), Stockholm (SE)

(72) Inventors: Maksym Girnyk, Solna (SE); Jonas Medbo, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 7 days.

(21) Appl. No.: 18/031,776

(22) PCT Filed: Oct. 14, 2020

(86) PCT No.: PCT/EP2020/078877
§ 371 (c)(1),
(2) Date: Apr. 13, 2023

(87) PCT Pub. No.: WO2022/078588
PCT Pub. Date: Apr. 21, 2022

(65) Prior Publication Data
US 2023/0387982 A1   Nov. 30, 2023

(51) Int. Cl.
*H04B 7/06*   (2006.01)
(52) U.S. Cl.
CPC .................. *H04B 7/0617* (2013.01)
(58) Field of Classification Search
CPC .................................................. H04B 7/0617
See application file for complete search history.

(56) References Cited

U.S. PATENT DOCUMENTS

| 8,743,015 | B1 | 6/2014 | West et al. |
| 2009/0160707 | A1 | 6/2009 | Lakkis |

(Continued)

OTHER PUBLICATIONS

Lawrence, N. P. et al., "5G Terrestrial Networks: Mobility and Coverage-Solution in Three Dimensions," IEEE Access, Jun. 7, 2017 (30 pages).

(Continued)

*Primary Examiner* — Janice N Tieu
(74) *Attorney, Agent, or Firm* — Rothwell, Figg, Ernst & Manbeck, P.C.

(57) ABSTRACT

A wireless communication device (10; 100) performs wireless transmissions via an antenna array of the wireless communication device (10; 100). The antenna array comprises multiple antenna elements with a first polarization, a second polarization, and a third polarization. For at least some of the wireless transmissions, the wireless communication device (10; 100) performs beamforming processing by, for the first polarization, weighting antenna signals each corresponding to a respective one of the multiple antenna elements by a first beamforming vector, for the second polarization, weighting antenna signals each corresponding to a respective one of the multiple antenna elements by a second beamforming vector, and for the third polarization, weighting antenna signals each corresponding to a respective one of the multiple antenna elements by a third beamforming vector. The first beamforming vector, the second beamforming vector, and the third beamforming vector result in spatial variations of an array factor of the antenna array which are reduced as compared to performing the beamforming processing of the signals without weighting the signals.

20 Claims, 9 Drawing Sheets

(56) References Cited

U.S. PATENT DOCUMENTS

| | | | |
|---|---|---|---|
| 2010/0246494 A1* | 9/2010 | Sanayei | H04B 7/0469 |
| | | | 370/328 |
| 2018/0205436 A1* | 7/2018 | Gil | H04B 7/0408 |
| 2019/0393729 A1 | 12/2019 | Contopanagos et al. | |
| 2021/0266044 A1* | 8/2021 | Jiang | H04B 7/10 |
| 2023/0275623 A1* | 8/2023 | Kim | H04W 16/28 |
| 2024/0079762 A1* | 3/2024 | Lee | H01Q 21/24 |

OTHER PUBLICATIONS

International Search Report and Written Opinion dated Jun. 18, 2021 issued in International Patent Application No. PCT/EP2020/078877 (10 pages).

Ta, S. X. et al., "A Tripolarized Antenna with Ultra-Wide Operational Bandwidth", Transactions on Antennas and Propagation, vol. XX, No. X, 2020 (11 pages).

Soltanalian, M. et al., "A fast algorithm for designing complementary sets of sequences", Elsevier, Signal Processing, vol. 93, 2013 (7 pages).

* cited by examiner

ORIENTATION-ROBUST OPERATION OF TRI-POLARIZED ANTENNA ARRAY

CROSS REFERENCE TO RELATED APPLICATIONS

This application is a 35 U.S.C. § 371 National Stage of International Patent Application No. PCT/EP2020/078877, filed Oct. 14, 2020.

TECHNICAL FIELD

The present invention relates to methods for controlling wireless transmissions and to corresponding devices, systems, and computer programs.

BACKGROUND

In wireless communication, it is known to utilize multi-antenna transmission for enhancing performance, e.g., in terms of throughput and/or capacity. For example, in a wireless communication network based on the LTE (Long Term Evolution) or the NR (New Radio) technology specified by 3GPP ($3^{rd}$ Generation Partnership Project), multi-user MIMO (MU-MIMO) communication may be used for serving several users simultaneously with the same time and frequency resource. In this case, an access node of the wireless communication network, in the LTE technology referred to as "eNB" and in the NR technology referred to as "gNB", and/or the user terminals, referred to as UEs (UE: user equipment), are equipped with multiple antennas, in particular antenna arrays. The multiple antennas enable spatial diversity for transmission of data in both an uplink (UL) direction from the UEs to the network and a downlink (DL) direction from the network to the UEs. The spatial diversity significantly increases the capacity of the network. Accordingly, the MU-MIMO technology may allow for a more efficient utilization of the available frequency spectrum. Moreover, the MU-MIMO technology can reduce inter-cell interference which in turn may allow for more frequency reuse. As the electromagnetic spectrum is a scarce resource, the MU-MIMO technology may constitute a valuable contribution when aiming at extension of the capacity of the wireless communication network.

For enhancing performance, multi-antenna systems may be based on dual-polarized antennas. Typically, a dual-polarized antenna in such system consists of two radiating elements, and different polarizations may be provided by orienting the radiating elements in different directions. By leveraging on polarization diversity, it is possible to increase transmission rates by means of spatial multiplexing and beamforming and/or to improve transmission robustness.

However, performance of dual-polarized antenna systems depends on relative positioning and rotations of antennas at the transmitter and receiver side. Orientation robustness is hence an important aspect in such systems, in particular in the case of mobile devices, where the relative positioning and orientation of transmitter and receiver may be subject to significant variation.

In "5G terrestrial networks: Mobility and coverage in three dimensions", by N. P. Lawrence et al., IEEE Access vol. 5 (2017), it was shown that orientation robustness can be significantly improved by employing tri-polarized antennas. Tri-polarized antennas have three ports based on orthogonally oriented radiating elements. A tri-polarized antenna can for example be formed by three orthogonally oriented electric dipoles, three orthogonally oriented magnetic dipoles, or a combination of electric and magnetic dipoles, e.g., two electric dipoles and one magnetic dipole or one electric dipole and two magnetic dipoles. The latter variant may offer the benefit of a fully planar implementation, which is particularly attractive for implementation of antenna arrays.

FIGS. 1A, 1B, 1C, and 1D illustrate how tri-polarized antennas may be used to improve orientation robustness. FIGS. 1A and 1B illustrate polarization diversity that can be achieved by a dual-polarized antenna 11T at the transmitter and a dual-polarized antenna 11R at the receiver. In these examples, a first radiating element of the dual-polarized antenna 11T is assumed to have an orientation described by vector $\hat{n}$, and a second radiating element of the dual-polarized antenna 11T is assumed to have an orientation described by vector $\hat{o}$, which is orthogonal to $\hat{n}$. A first radiating element of the dual-polarized antenna 11R is assumed to have an orientation described by vector $\hat{q}$, and a second radiating element of the dual-polarized antenna 11R is assumed to have an orientation described by vector $\hat{r}$, which is orthogonal to $\hat{q}$. In the example of FIG. 1A, the vectors $\hat{n}$ and $\hat{q}$ are aligned and parallel to each other, and also the vectors $\hat{o}$ and $\hat{r}$ are aligned and parallel to each other, giving a polarization diversity of two. In the example of FIG. 1B, the vectors $\hat{o}$ and $\hat{r}$ are aligned and parallel to each other, but the vectors $\hat{n}$ and $\hat{q}$ co-linear so that the corresponding polarization direction cannot be utilized between the transmitter and the receiver and no polarization diversity is possible. Accordingly, in some scenarios a dual-polarized channel like shown in the example of FIG. 1A may collapse to a single-polarized channel like shown in the example of FIG. 1B.

FIG. 1C shows a situation which is similar to that of FIG. 1B, however assuming that the transmitter is equipped with a tri-polarized antenna 21T having a first radiating element with an orientation described by vector $\hat{m}$, a second radiating element with an orientation described by vector $\hat{n}$, which is orthogonal to $\hat{m}$, and a third radiating element with an orientation described by vector $\hat{o}$, which is orthogonal to $\hat{m}$ and $\hat{n}$. A first radiating element of the dual-polarized antenna 11R is assumed to have an orientation described by vector $\hat{q}$, and a second radiating element of the dual-polarized antenna 11R is assumed to have an orientation described by vector $\hat{r}$, which is orthogonal to $\hat{q}$. In the example of FIG. 1C, the vectors n and r are aligned and parallel to each other. However, the vectors $\hat{m}$ and $\hat{q}$ co-linear so that the corresponding polarization direction cannot be utilized between the transmitter and the receiver. Further, the vectors $\hat{q}$ and $\hat{r}$ are both orthogonal to the vector $\hat{o}$ describing the orientation and position of the third radiating element of the tri-polarized antenna at the transmitter, so that also the polarization direction corresponding to the third radiating element cannot be utilized between the transmitter and the receiver. Accordingly, also in the scenario of FIG. 1C, only a single-polarized channel can be utilized.

In the example of FIG. 1D, the transmitter is equipped with a tri-polarized antenna 21T having a first radiating element with an orientation described by vector $\hat{m}$, a second radiating element with an orientation described by vector $\hat{n}$, which is orthogonal $\hat{m}$, and a third radiating element with an orientation described by vector $\hat{o}$, which is orthogonal to $\hat{m}$ and $\hat{n}$. Further, also the receiver is equipped with a tri-polarized antenna 21R having a first radiating element with an orientation described by vector $\hat{p}$, a second radiating element with an orientation described by vector $\hat{q}$, which is orthogonal to $\hat{p}$, and a third radiating element with an orientation described by vector $\hat{r}$, which is orthogonal to $\hat{p}$ and q̂. As can be seen from the example of FIG. 1D, at least two polarization directions can be utilized in any relative position of the receiver and transmitter. For the upper right position of the receiver, even three polarization directions could be utilized.

However, in the case of antenna arrays, e.g., like planned for 6G (6$^{th}$ Generation) wireless communication networks, beamforming effects cause significant sensitivity of transmissions to orientation mismatch, even when utilizing tri-polarized antenna elements in the array. In particular, the array arrangement of the antenna elements results in the overall tri-polarized deployment no longer being rotation invariant. These effects increase with aperture size of the antenna array.

Accordingly, there is a need for techniques which allow for efficiently achieving orientation robustness for antenna arrays formed of tri-polarized antenna elements.

SUMMARY

According to an embodiment, method of controlling wireless transmissions is provided. According to the method, a wireless communication device performs wireless transmissions via an antenna array of the wireless communication device. The antenna array comprises multiple antenna elements with a first polarization, a second polarization, and a third polarization. For at least some of the wireless transmissions, the wireless communication device performs beamforming processing by, for the first polarization, weighting antenna signals each corresponding to a respective one of the multiple antenna elements by a first beamforming vector, for the second polarization, weighting antenna signals each corresponding to a respective one of the multiple antenna elements by a second beamforming vector, and for the third polarization, weighting antenna signals each corresponding to a respective one of the multiple antenna elements by a third beamforming vector. The first beamforming vector, the second beamforming vector, and the third beamforming vector result in spatial variations of an array factor of the antenna array which are reduced as compared to performing the beamforming processing of the signals without weighting the signals.

According to an embodiment, method of controlling wireless transmissions is provided. The method comprises configuring a wireless communication device for performing wireless transmissions via an antenna array of the wireless communication device, the antenna array comprising multiple antenna elements with a first polarization, a second polarization, and a third polarization. Further, the method comprises configuring the wireless communication device to, for at least some of the wireless transmissions, perform beamforming processing by: for the first polarization, weighting antenna signals each corresponding to a respective one of the multiple antenna elements by a first beamforming vector, for the second polarization, weighting antenna signals each corresponding to a respective one of the multiple antenna elements by a second beamforming vector, and for the third polarization, weighting antenna signals each corresponding to a respective one of the multiple antenna elements by a third beamforming vector. The first beamforming vector, the second beamforming vector, and the third beamforming vector result in spatial variations of an array factor of the antenna array which are reduced as compared to performing the beamforming processing of the signals without weighting the signals.

According to a further embodiment, a wireless communication device is provided. The wireless communication device is configured to perform wireless transmissions via an antenna array of the wireless communication device. The antenna array comprises multiple antenna elements with a first polarization, a second polarization, and a third polarization. Further, the wireless communication device is configured to perform beamforming processing for at least some of the wireless transmissions, perform beamforming processing by: for the first polarization, weighting antenna signals each corresponding to a respective one of the multiple antenna elements by a first beamforming vector, for the second polarization, weighting antenna signals each corresponding to a respective one of the multiple antenna elements by a second beamforming vector, and for the third polarization, weighting antenna signals each corresponding to a respective one of the multiple antenna elements by a third beamforming vector. The first beamforming vector, the second beamforming vector, and the third beamforming vector result in spatial variations of an array factor of the antenna array which are reduced as compared to performing the beamforming processing of the signals without weighting the signals.

According to a further embodiment, a wireless communication device is provided. The wireless communication device comprises at least one processor and a memory. The memory contains instructions executable by said at least one processor, whereby the wireless communication device is operative to perform wireless transmissions via an antenna array of the wireless communication device. The antenna array comprises multiple antenna elements with a first polarization, a second polarization, and a third polarization. Further, the memory contains instructions executable by said at least one processor, whereby the wireless communication device is operative to perform beamforming processing for at least some of the wireless transmissions, perform beamforming processing by: for the first polarization, weighting antenna signals each corresponding to a respective one of the multiple antenna elements by a first beamforming vector, for the second polarization, weighting antenna signals each corresponding to a respective one of the multiple antenna elements by a second beamforming vector, and for the third polarization, weighting antenna signals each corresponding to a respective one of the multiple antenna elements by a third beamforming vector. The first beamforming vector, the second beamforming vector, and the third beamforming vector result in spatial variations of an array factor of the antenna array which are reduced as compared to performing the beamforming processing of the signals without weighting the signals.

According to a further embodiment, an apparatus for configuring a wireless communication device is provided. The apparatus is adapted to configure a wireless communication device for performing wireless transmissions via an antenna array of the wireless communication device, the antenna array comprising multiple antenna elements with a first polarization, a second polarization, and a third polarization. Further, the apparatus is adapted to configure the wireless communication device to, for at least some of the wireless transmissions, perform beamforming processing by: for the first polarization, weighting antenna signals each corresponding to a respective one of the multiple antenna elements by a first beamforming vector, for the second polarization, weighting antenna signals each corresponding to a respective one of the multiple antenna elements by a second beamforming vector, and for the third polarization, weighting antenna signals each corresponding to a respective one of the multiple antenna elements by a third beamforming vector. The first beamforming vector, the second beamforming vector, and the third beamforming vector result in spatial variations of an array factor of the antenna array which are reduced as compared to performing the beamforming processing of the signals without weighting the signals.

According to a further embodiment, an apparatus for configuring a wireless communication device is provided. The apparatus comprises at least one processor and a memory. The memory contains instructions executable by said at least one processor, whereby the apparatus is operative to configure a wireless communication device for performing wireless transmissions via an antenna array of the wireless communication device, the antenna array comprising multiple antenna elements with a first polarization, a second polarization, and a third polarization. Further, the memory contains instructions executable by said at least one processor, whereby the apparatus is operative to configure the wireless communication device to, for at least some of the wireless transmissions, perform beamforming processing by: for the first polarization, weighting antenna signals each corresponding to a respective one of the multiple antenna elements by a first beamforming vector, for the second polarization, weighting antenna signals each corresponding to a respective one of the multiple antenna elements by a second beamforming vector, and for the third polarization, weighting antenna signals each corresponding to a respective one of the multiple antenna elements by a third beamforming vector. The first beamforming vector, the second beamforming vector, and the third beamforming vector result in spatial variations of an array factor of the antenna array which are reduced as compared to performing the beamforming processing of the signals without weighting the signals.

According to a further embodiment of the invention, a computer program or computer program product is provided, e.g., in the form of a non-transitory storage medium, which comprises program code to be executed by at least one processor of a wireless communication device. Execution of the program code causes the wireless communication device to perform wireless transmissions via an antenna array of the wireless communication device. The antenna array comprises multiple antenna elements with a first polarization, a second polarization, and a third polarization. Further, execution of the program code causes the wireless communication device to perform beamforming processing for at least some of the wireless transmissions, perform beamforming processing by: for the first polarization, weighting antenna signals each corresponding to a respective one of the multiple antenna elements by a first beamforming vector, for the second polarization, weighting antenna signals each corresponding to a respective one of the multiple antenna elements by a second beamforming vector, and for the third polarization, weighting antenna signals each corresponding to a respective one of the multiple antenna elements by a third beamforming vector. The first beamforming vector, the second beamforming vector, and the third beamforming vector result in spatial variations of an array factor of the antenna array which are reduced as compared to performing the beamforming processing of the signals without weighting the signals.

According to a further embodiment of the invention, a computer program or computer program product is provided, e.g., in the form of a non-transitory storage medium, which comprises program code to be executed by at least one processor of an apparatus for configuring a wireless communication device. Execution of the program code causes the apparatus to configure a wireless communication device for performing wireless transmissions via an antenna array of the wireless communication device, the antenna array comprising multiple antenna elements with a first polarization, a second polarization, and a third polarization.

Further, execution of the program code causes the apparatus to configure the wireless communication device to, for at least some of the wireless transmissions, perform beamforming processing by: for the first polarization, weighting antenna signals each corresponding to a respective one of the multiple antenna elements by a first beamforming vector, for the second polarization, weighting antenna signals each corresponding to a respective one of the multiple antenna elements by a second beamforming vector, and for the third polarization, weighting antenna signals each corresponding to a respective one of the multiple antenna elements by a third beamforming vector. The first beamforming vector, the second beamforming vector, and the third beamforming vector result in spatial variations of an array factor of the antenna array which are reduced as compared to performing the beamforming processing of the signals without weighting the signals.

Details of such embodiments and further embodiments will be apparent from the following detailed description of embodiments.

DETAILED DESCRIPTION OF EMBODIMENTS

In the following, concepts in accordance with exemplary embodiments of the invention will be explained in more detail and with reference to the accompanying drawings. The illustrated embodiments relate to controlling of multi-antenna transmission in a wireless communication network. The wireless communication network may be based on the LTE radio technology or the NR radio technology. However, it is noted that the illustrated concepts could also be applied to other radio technologies, e.g., a 6G technology or a WLAN (Wireless Local Area Network) technology.

In the illustrated examples, beamforming processing is used to reduce spatial variations of an array factor of an antenna array formed of multiple antenna elements each having a tri-polarized configuration. Thereby allowing to benefit from supporting multiple polarization directions, while at the same time avoiding undesired beamforming effects caused by the array geometry.

Figure 1A:
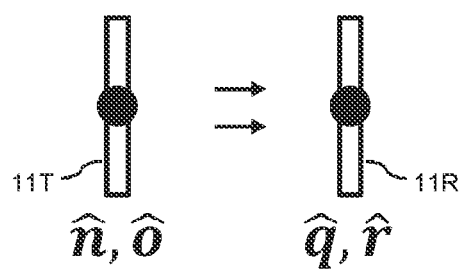
FIGS. 1A, 1B, 1C, 1D schematically illustrate how tri-polarized antennas can be used to improve orientation robustness of wireless transmissions.
Figure 1B:
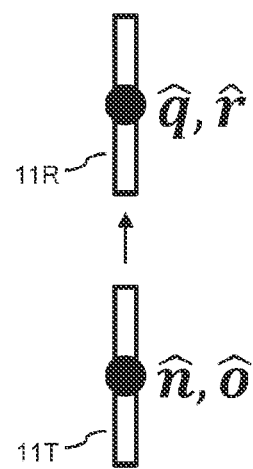
Figure 1C:
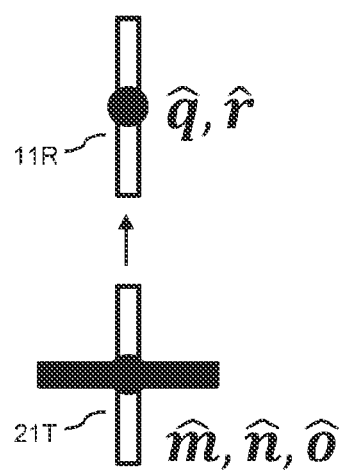
Figure 1D:
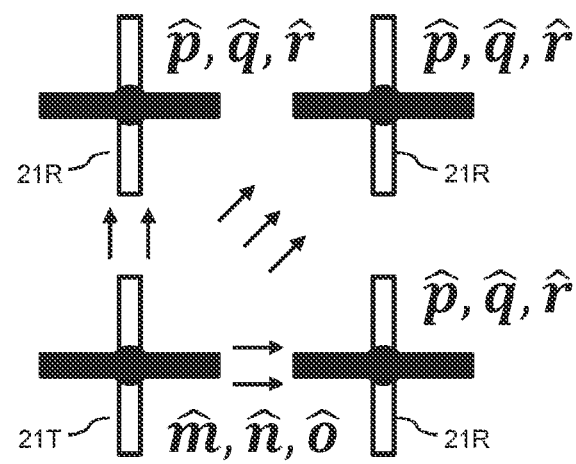
Figure 2:
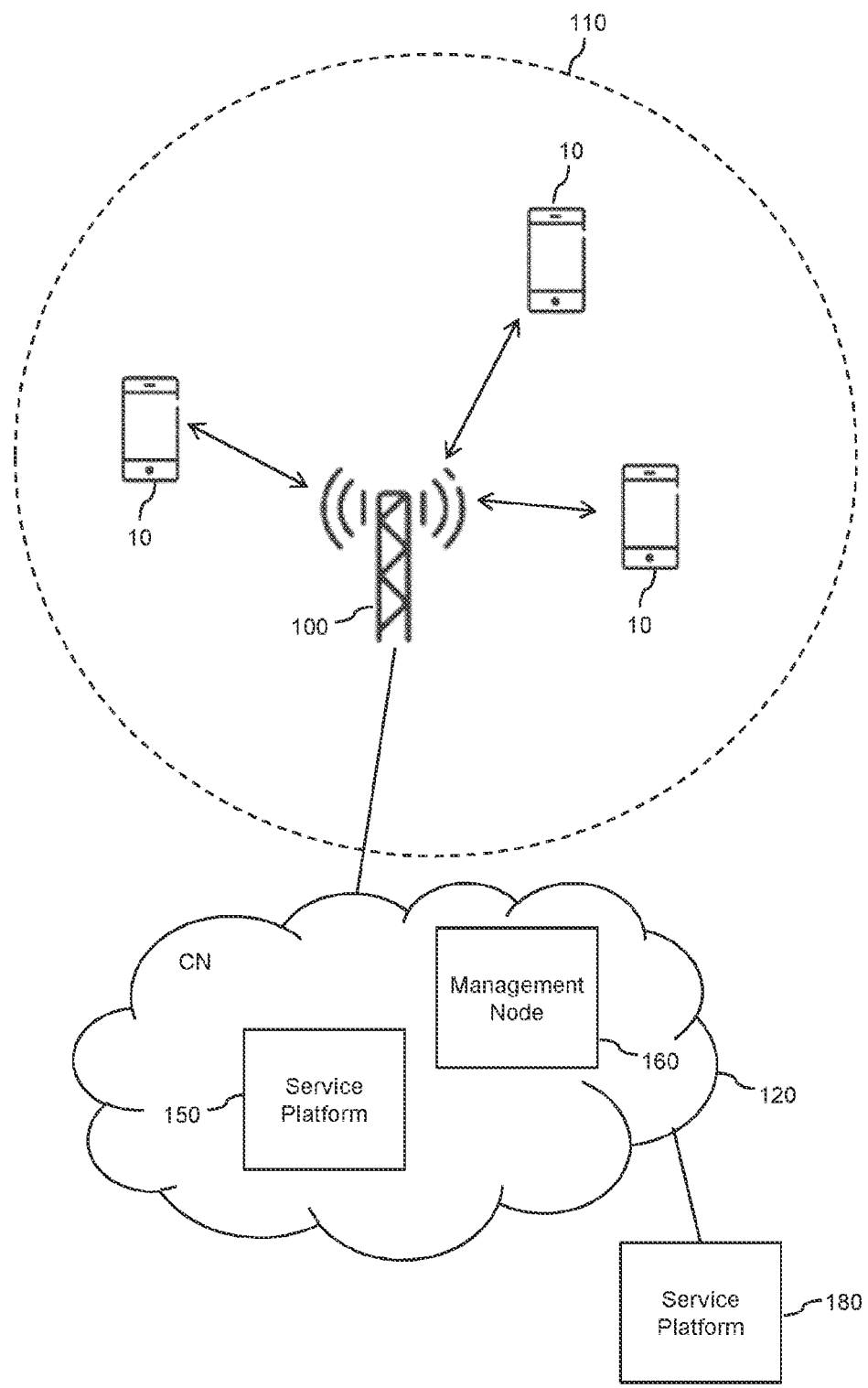
FIG. 2 schematically illustrates a wireless communication scenario according to an embodiment of the invention.

FIG. 2 illustrates exemplary wireless communication network structures. In particular, FIG. 2 shows multiple UEs 10 in a cell 110 of the wireless communication network. The cell 110 is assumed to be served by an access node 100, e.g., an eNB of the LTE technology or a gNB of the NR technology. Further, FIG. 2 illustrates a core network (CN) 120 of the wireless communication network. The CN 120 may for example provide control and management functionalities. In the example of FIG. 2, the CN 120 includes a management node 160, which may for example be used to perform various configuration operations with respect to the UEs and/or the access node 100.

As illustrated by double-headed arrows, the access node 100 may send DL transmissions to the UEs, and the UEs may send UL transmissions to the access node 100. The DL transmissions and UL transmissions may be used to provide various kinds of services to the UEs, e.g., a voice service, a multimedia service, or a data service. Such services may be hosted in the wireless communication network. By way of example, FIG. 2 illustrates a service platform 150 provided in the core network 120. The service platform 150 may for example be based on a server or a cloud computing system. Further, FIG. 2 illustrates a service platform 180 provided outside the wireless communication network. The service platform 180 could for example connect through the Internet or some other wide area communication network to the wireless communication network. Also the service platform 180 may be based on a server or a cloud computing system. The service platform 150 and/or the service platform 180 may provide one or more services to the UEs 10, using data conveyed by DL transmissions and/or UL transmissions between the access node 100 and the respective UE 10.

Figure 3:
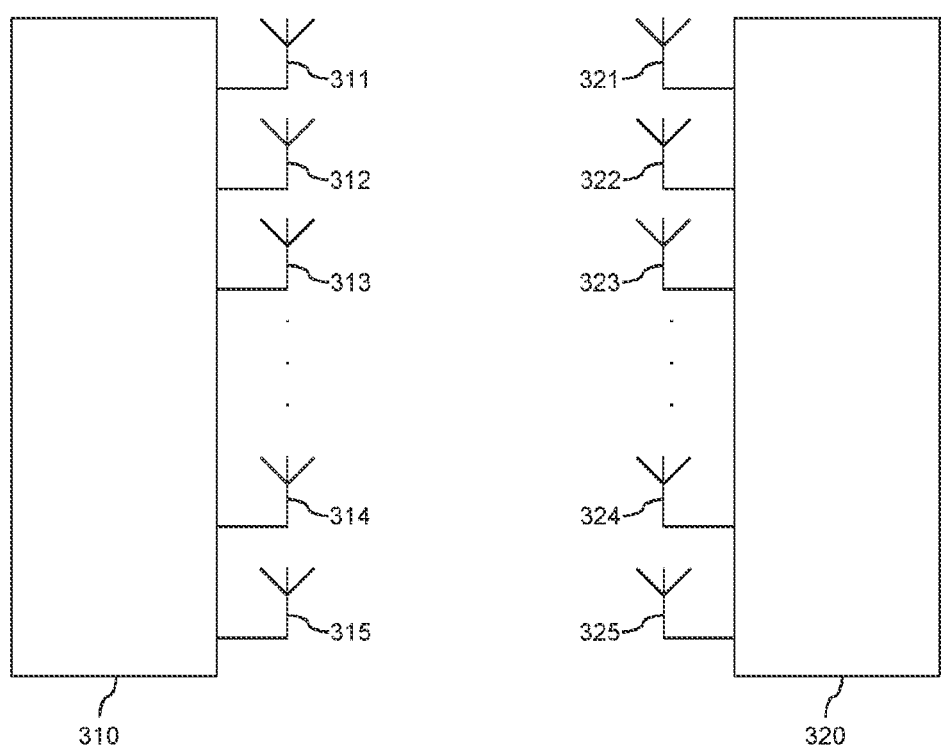
FIG. 3 schematically illustrates transmitter and a receiver according to an embodiment of the invention.

FIG. 3 schematically illustrates multi-antenna transmission between a transmitter device 310 and a receiver device 320. Assuming DL transmissions in a wireless communication network like illustrated in FIG. 2, the transmitter device 310 may correspond to the access node 100, and the receiver device 320 may correspond to one of the UEs 10. As illustrated in FIG. 3, the transmitter device 310 is equipped with a plurality of transmit antenna elements 311, 312, 313, 314, 315. As further illustrated, the receiver device 320 is equipped with a number of receive antenna elements. Specifically, the receiver device 320 is equipped with receive antenna elements 321, 322, 323, 324, 325. It is noted that the illustrated number of the transmit antenna elements and the illustrated number of the receive antenna elements other numbers could be utilized as well. For example, when using a 6G technology, the number of transmit or receive antennas at the access node or UE may be 1024 or higher. The transmit antenna elements each have a tri-polarized configuration, i.e., are capable of transmitting signals with three different polarization directions. These three polarizations may correspond to three mutually orthogonal spatial orientations. The tri-polarized configuration of the antenna elements can for example be based by three orthogonally oriented electric dipoles, three orthogonally oriented magnetic dipoles, or a combination of electric and magnetic dipoles, e.g., two electric dipoles and one magnetic dipole or one electric dipole and two magnetic dipoles.

To in order to improve orientation robustness for wireless transmissions using an array of tri-polarized antenna elements, the illustrated concepts utilize beamforming processing of antenna signals. In particular, the beamforming processing is performed in such a way that variations of beamforming gain for one polarization is compensated by variations in other polarizations. In this way, a spatial variation of an overall array factor of the antenna array can be reduced or minimized.

In the following, the illustrated concepts will be further explained with reference to a simplified scenario involving utilization of a uniform linear array (ULA) of tri-polarized antennas. Such ULA of tri-polarized antennas could for example be formed by the above-mentioned transmitter antenna elements 311, 312, 313, 314, 315 or by the above-mentioned receiver antenna elements 321, 322, 323, 324, 325. As mentioned above, each antenna element may have a tri-polarized configuration with three mutually orthogonal polarization directions, in the following denoted as first polarization, second polarization, and third polarization. The beamforming processing is based on a set of three beamforming vectors ($w_1$, $w_2$, $w_3$), namely a first beamforming vector $w_1$ for the first polarization, a second beamforming vector $w_2$ for the second polarization, and a third beamforming vector $w_3$ for the third polarization. These beamforming vectors are optimized with the aim of equalizing the sum of radiated (or received) power over different directions, in particular optimized with the aim of providing a constant array factor of the array of tri-polarized antenna elements.

According to the Wiener-Khinchine transform, the above optimization criterion may be formulated as:

$$\sum_{p=1}^{3} R_{w_p}(\tau) = 3N\delta(\tau)$$

where $R_{u_p}(\tau)$ is an aperiodic autocorrelation function of vector u at lag $\tau$, N is the number of tri-polarized antenna elements, and is the Dirac delta function.

The optimization problem may for example be solved by using an iterative algorithm similar to that proposed in "A fast algorithm for designing complementary sets of sequences", by M. Soltanalian et al., Signal Processing 93, no. 7 (2013). Such algorithm may for example include the following steps:

Step 1: Define $W=[w_1, w_2, w_3] \in \mathbb{C}^{N \times 3}$ as a matrix formed by stacking the beamforming vectors $w_1$, $w_2$, $w_3$ side-by-side.

Step 2: Initialize W random unit-modulus entries, e.g., $W=e^{2\pi j\, rand(N,3)}$.

Step 3: While $\|W^{(t+1)} - W^{(t)}\|_F > \epsilon$ for some predefined $\epsilon$ iteratively perform the following substeps A to F:

A. Pad matrix W with zeros, i.e., $$Z \equiv \begin{bmatrix} W \\ 0_{N \times 3} \end{bmatrix},$$

and compute $\bar{S}=DZ$, where D is a DFT (Discrete Fourier Transform) matrix of size 2N.

B. Normalize the rows of W with their vector norms, i.e., set $\bar{s}_k^T \leftarrow \bar{s}_k^T / \|\bar{s}_k^T\|_2$, $\forall k=1, \ldots, 2N$, where $s_k$ denotes the k-th row of W.

C. Compute matrix $S=\sqrt{MN}[\bar{s}_1, \ldots, \bar{s}_{2N}]$.
D. Compute matrix $F=D^H S$.

E. Compute weights $[W]_{n,p} = \begin{cases} [F]_{n,p}, & 1 \le n \le N \\ 0, & n > N \end{cases}$.

F. Return to A for next iteration or end iterative process.

The obtained beamforming vectors $w_1$, $w_2$, $w_3$ are then used in the beamforming processing for weighting the antenna signals for each of the three polarizations. The resulting array factor of the antenna array is substantially rotation invariant.

Figure 4:
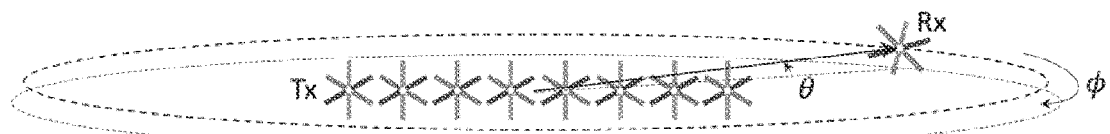
FIG. 4 shows an exemplary scenario in which beamforming processing in accordance with an embodiment of the invention is applied for an antenna array with eight tri-polarized antenna elements.

The effectiveness of the illustrated concepts can be demonstrated by considering an exemplary scenario as illustrated in FIG. 4. The scenario of FIG. 4 considers an experimental setup using uniform linear array of N=8 tri-polarized antenna elements at a transmitter (Tx), e.g., at the above-mentioned transmitter device 310. The antenna elements are assumed to be each formed of three mutually orthogonal electric dipoles.

For this scenarios, the above algorithm yields the following results for the beamforming vectors:

$$w_1 = \begin{bmatrix} 0.7689 + 0.6393i \\ 0.9942 + 0.1074i \\ -0.8760 - 0.4823i \\ 0.6991 + 0.7150i \\ -0.7914 - 0.6113i \\ -0.6044 - 0.7967i \\ -0.1277 + 0.9918i \\ -0.9965 + 0.0835i \end{bmatrix},$$

$$w_2 = \begin{bmatrix} -0.6645 - 0.7473i \\ -0.9869 + 0.1613i \\ 0.1191 - 0.9929i \\ 0.8073 - 0.5901i \\ 0.0884 - 0.9961i \\ -0.7336 + 0.6796i \\ -0.9018 - 0.4321i \\ -0.5692 + 0.8222i \end{bmatrix}, \text{ and}$$

$$w_3 = \begin{bmatrix} 0.5544 - 0.8322i \\ -0.2824 + 0.9593i \\ 0.0003 - 1.000i \\ 0.6486 - 0.7612i \\ 0.9567 - 0.2911i \\ -0.0703 + 0.9975i \\ 0.4569 + 0.8895i \\ 0.8875 - 0.4615i \end{bmatrix}.$$

In the example of FIG. 4, it is further assumed that a receiver (Rx), e.g., the receiver device 320, is placed at some random location with respect to the transmitter and is moved around the transmitter on a circle at elevation angle $\theta=30°$, spanning all azimuth angles $\phi$. The receiver is assumed to utilize a single tri-polarized antenna formed of three mutually orthogonal electric dipoles for sensing the components of the electric field radiated by the transmitter. The receiver may then perform maximum-ratio combining to pick up all the energy of the different components. The propagation channel is assumed to be full line-of-sight under far-field conditions, so that only two polarization modes are available for transmission.

Figure 5:
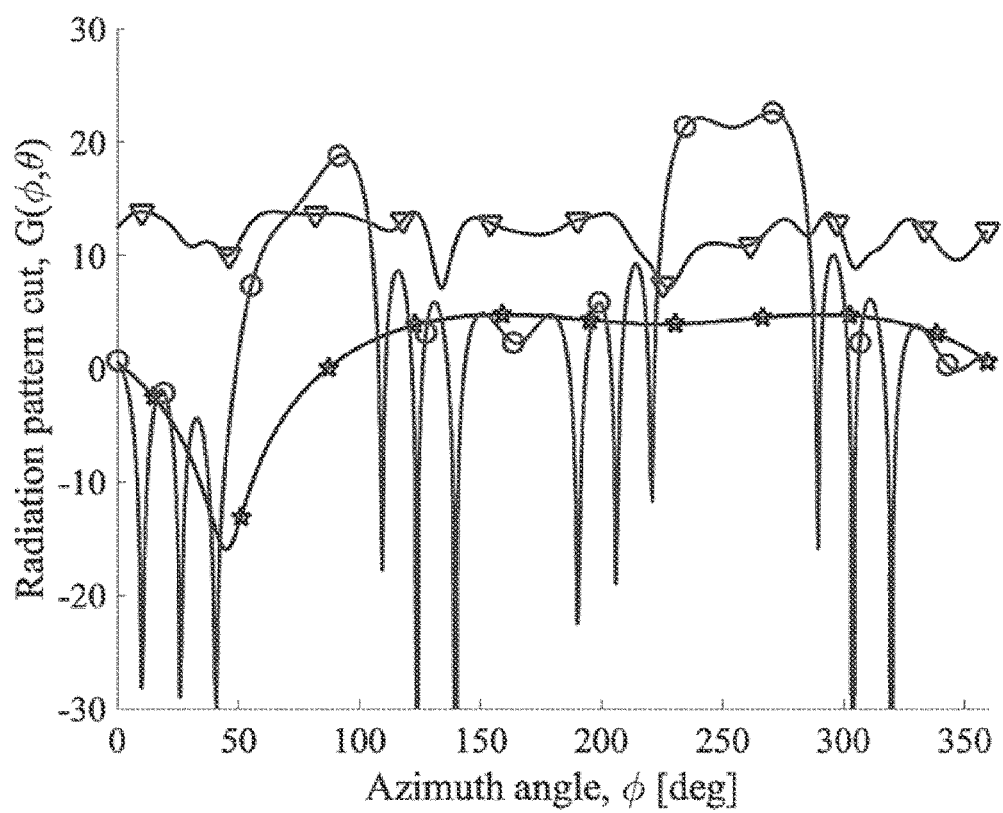
FIG. 5 shows measurement results for the scenario of FIG. 4.

FIG. 5 illustrates the resulting radiation pattern in terms of the array factor $G(\phi\theta)$ at the given elevation by a trace marked with triangle symbols. For comparison, FIG. 5 also illustrates the radiation power pattern which would be obtained when performing the beamforming processing without the weighting, i.e., when applying unitary beamforming vectors $w_1=w_2=w_3=[1, 1, \ldots, 1]^T$ (marked with open circle symbols), and the radiation pattern which would be obtained when using only a single tri-polarized antenna element at the transmitter (marked with star symbols). As can be seen from FIG. 5, the beamforming vectors determined according to the illustrated concepts significantly reduce the spatial variations of the array factor as compared to the case performing the beamforming processing without weighting. Some remaining ripples in the radiation pattern can be attributed to non-uniformities of the antenna elements.

It is noted that the beamforming processing using the special beamforming vectors $w_1$, $w_2$, $w_3$ may be applied in transmission modes which benefit from a substantially omnidirectional characteristic of the antenna array, e.g., when transmitting in a broadcast mode or when transmitting to a receiver at an unknown or not precisely known position. In other transmission modes, the beamforming processing may be switched to applying beamforming vectors which are calculated to direct maxima of the radiation pattern towards the position of the intended receiver. That is to say, the wireless communication device may also perform beamforming processing using beamforming vectors which are adaptively determined to define one or more directional beams for targeting one or more further wireless communication devices. Further, it is noted that the beamforming processing using the special beamforming vectors $w_1$, $w_2$, $w_3$ may also be applied when receiving signals using an antenna array of multiple antenna elements each having a tri-polarized configuration, e.g., at the above-mentioned receiver device 320.

Figure 6:
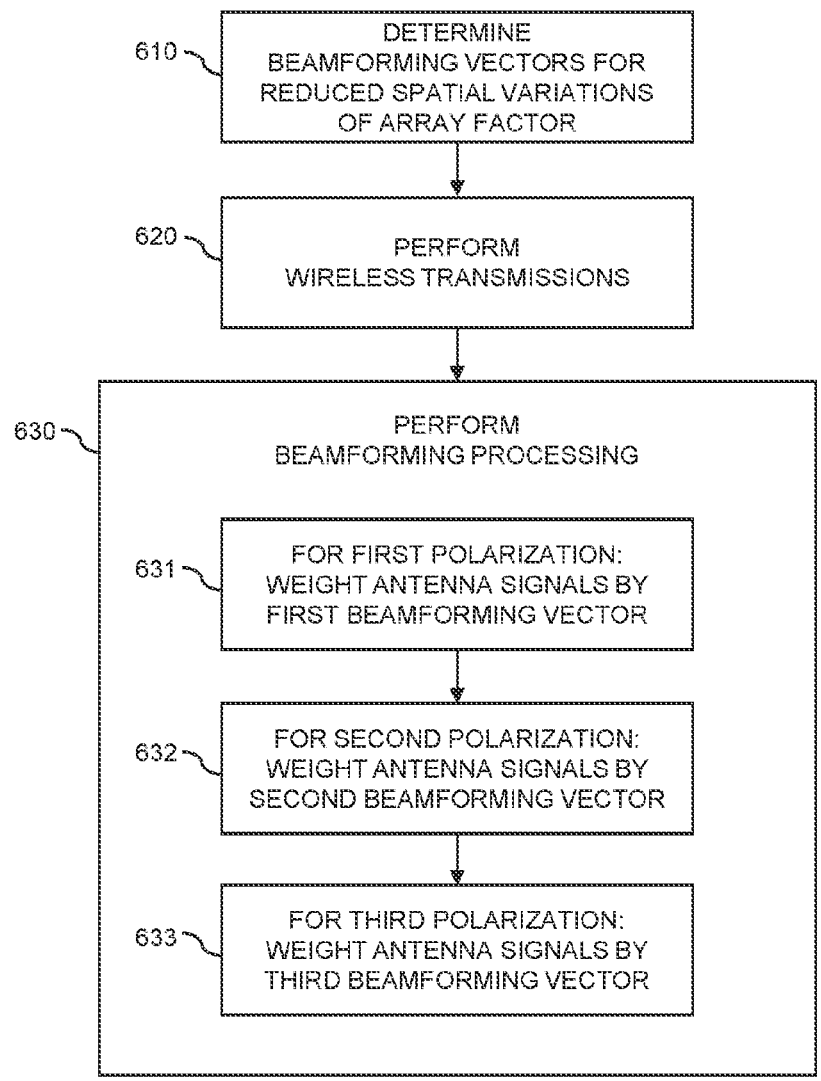
FIG. 6 shows a flowchart for illustrating a method according to an embodiment of the invention.

FIG. 6 shows a flowchart for illustrating a method of controlling wireless transmissions, which may be utilized for implementing the illustrated concepts. The method of FIG. 6 may be used for implementing the illustrated concepts in a wireless communication device, e.g., corresponding to any of the above-mentioned entities 10, 100, 310, or 320. The wireless communication device is assumed to be provided with an antenna array that includes multiple antenna elements with a first polarization, a second polarization, and a third polarization. The first polarization, the second polarization, and the third polarization may be orthogonal linear polarizations. Each antenna element may include at least one electric dipole antenna element and/or at least one magnetic loop antenna element. In some scenarios, each antenna element may include a combination of at least one electric dipole element and at least one magnetic loop element. The antenna array may be implemented as a phased array.

In some scenarios, the wireless communication device may be a mobile communication device, such as one of the above-mentioned UEs. In some scenarios, the wireless communication device may be an access node of a wireless communication network, such as the above-mentioned access node 100.

If a processor-based implementation of the wireless communication device is used, at least some of the steps of the method of FIG. 6 may be performed and/or controlled by one or more processors of the wireless communication device. Such wireless communication device may also include a memory storing program code for implementing at least some of the below described functionalities or steps of the method of FIG. 6.

At step 610, the wireless communication device may determine beamforming vectors for wireless transmissions via the antenna array of the wireless communication device. The first beamforming vector, the second beamforming vector, and the third beamforming vector may be determined by optimization based on, for each of the first polarization, second polarization, and third polarization, autocorrelation of antenna signals each corresponding to a respective one of the multiple antenna elements. In particular, the first beamforming vector, the second beamforming vector, and the third beamforming vector may be determined by optimization with the aim that a sum of an aperiodic autocorrelation function of the antenna signals for the first polarization when applying the first beamforming vector, an aperiodic autocorrelation function of the antenna signals for the second polarization and when applying the second beamforming vector, and an aperiodic autocorrelation function of the antenna signals for the third polarization when applying the third beamforming vector becomes equal to a Dirac delta function. In some scenarios, calculations for the optimization may at least in part be performed by the wireless communication device. In other scenarios, the first beamforming vector, the second beamforming vector, and the third beamforming vector may be pre-configured in the wireless communication device, e.g., based on manufacturer settings or based on operator settings.

At step 620, the wireless communication device performs wireless transmissions via the antenna array of the wireless communication device. The wireless transmissions may for example include broadcast transmissions or transmissions to one or more intended recipients at an unknown or not precisely known location. Performing the wireless transmissions may involve that the wireless communication device sends at least some of the wireless transmissions and/or that the wireless communication device receives at least some of the wireless transmissions.

At step 630, the wireless communication device performs beamforming processing for at least some of the wireless transmissions. The beamforming processing involves the following substeps: at step 631, for the first polarization, weighting antenna signals each corresponding to a respective one of the multiple antenna elements by a first beamforming vector; at step 632, for the second polarization, weighting antenna signals each corresponding to a respective one of the multiple antenna elements by a second beamforming vector, and at step 632, for the third polarization, weighting antenna signals each corresponding to a respective one of the multiple antenna elements by a third beamforming vector. Here, the first beamforming vector, the second beamforming vector, and the third beamforming vector result in spatial variations of an array factor of the antenna array which are reduced as compared to performing the beamforming processing of the signals without weighting the signals.

In some scenarios, the wireless communication device may be provided with multiple modes of operation. In particular, in a first mode of operation, the wireless communication device may perform one or more of the wireless transmissions based on the beamforming processing with the first beamforming vector, the second beamforming vector, and the third beamforming vector. In a second mode of operation, the wireless communication device may perform one or more of the wireless transmissions based on performing the beamforming processing by: for the first polarization, weighting antenna signals each corresponding to a respective one of the multiple antenna elements by a first targeted beamforming vector, for the second polarization, weighting antenna signals each corresponding to a respective one of the multiple antenna elements by a second targeted beamforming vector, and for the third polarization, weighting antenna signals each corresponding to a respective one of the multiple antenna elements by a third targeted beamforming vector. Here, the first targeted beamforming vector, the second targeted beamforming vector, and the third targeted beamforming vector may be adaptively determined to define one or more directional beams for targeting one or more further wireless communication devices.

Figure 7:
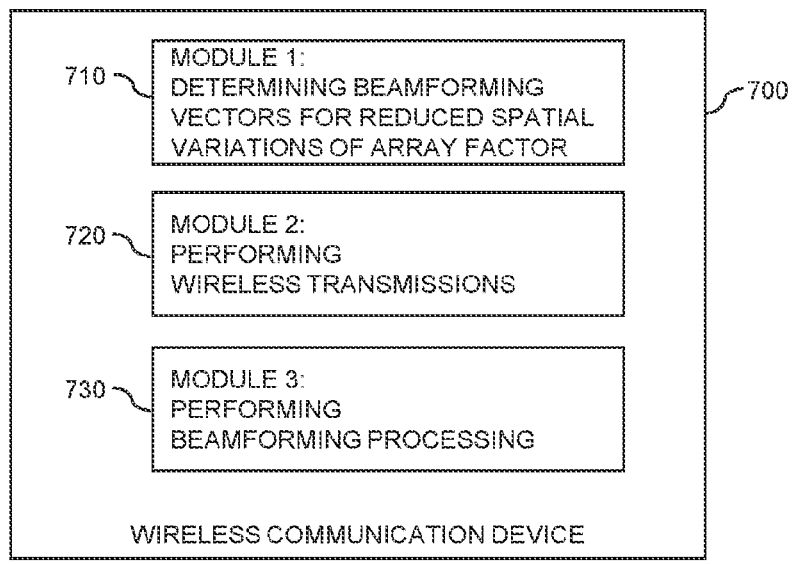
FIG. 7 shows an exemplary block diagram for illustrating functionalities of a wireless communication device implementing functionalities corresponding to the method of FIG. 6.

FIG. 7 shows a block diagram for illustrating functionalities of a wireless communication device 700 which operates according to the method of FIG. 6. The wireless communication device 700 may for example correspond to be part of any of the above-mentioned entities 10, 100, 310, or 320. As illustrated, the wireless communication device 700 may be provided with a module 710 configured to determine beamforming vectors, such as explained in connection with step 610. Further, the wireless communication device 700 may be provided with a module 720 configured to perform wireless transmissions, such as explained in connection with step 620. Further, the wireless communication device 700 may be provided with a module 730 configured to perform beamforming processing, such as explained in connection with step 630.

It is noted that the wireless communication device 700 may include further modules for implementing other functionalities, such as known functionalities of a UE or of an access node for a wireless communication network. Further, it is noted that the modules of the wireless communication device 700 do not necessarily represent a hardware structure of the wireless communication device 700, but may also correspond to functional elements, e.g., implemented by hardware, software, or a combination thereof.

Figure 8:
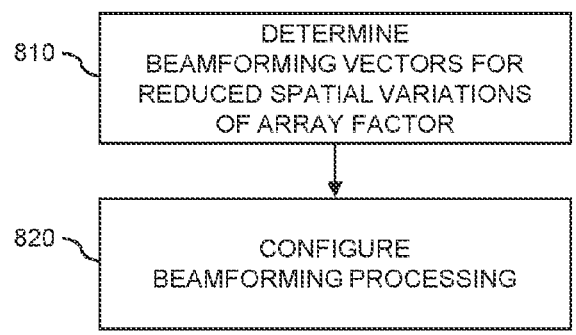
FIG. 8 shows a flowchart for illustrating a further method according to an embodiment of the invention.

FIG. 8 shows a flowchart for illustrating a method of configuring wireless communication device, which may be utilized for implementing the illustrated concepts. The method of FIG. 8 may be used for implementing the illustrated concepts in an apparatus for configuring a wireless communication device, e.g., in manufacturer equipment or in a node of a wireless communication network, e.g., such as in the above-mentioned access node 100 or management node 160. The wireless communication device to be configured is assumed to be provided with an antenna array that includes multiple antenna elements with a first polarization, a second polarization, and a third polarization. The first polarization, the second polarization, and the third polarization may be orthogonal linear polarizations. Each antenna element may include at least one electric dipole antenna element and/or at least one magnetic loop antenna element. In some scenarios, each antenna element may include a combination of at least one electric dipole element and at least one magnetic loop element. The antenna array may be implemented as a phased array.

In some scenarios, the wireless communication device may be a mobile communication device, such as one of the above-mentioned UEs. In some scenarios, the wireless communication device may be an access node of a wireless communication network, such as the above-mentioned access node 100.

If a processor-based implementation of the apparatus is used, at least some of the steps of the method of FIG. 8 may be performed and/or controlled by one or more processors of the apparatus. Such apparatus may also include a memory storing program code for implementing at least some of the below described functionalities or steps of the method of FIG. 8.

At step 810, beamforming vectors for wireless transmissions via the antenna array of the wireless communication device are determined. The first beamforming vector, the second beamforming vector, and the third beamforming vector may be determined by optimization based on, for each of the first polarization, second polarization, and third polarization, autocorrelation of antenna signals each corresponding to a respective one of the multiple antenna elements. In particular, the first beamforming vector, the second beamforming vector, and the third beamforming vector may be determined by optimization with the aim that a sum of an aperiodic autocorrelation function of the antenna signals for the first polarization when applying the first beamforming vector, an aperiodic autocorrelation function of the antenna signals for the second polarization and when applying the second beamforming vector, and an aperiodic autocorrelation function of the antenna signals for the third polarization when applying the third beamforming vector becomes equal to a Dirac delta function. In some scenarios, calculations for the optimization may at least in part be performed by the apparatus performing the method of FIG. 8.

At step 820, the beamforming processing to be performed by the wireless communication device is configured. The configured beamforming processing has the purpose of being applied to wireless transmissions performed via the antenna array of the wireless communication device. The wireless transmissions may for example include broadcast transmissions or transmissions to one or more intended recipients at an unknown or not precisely known location. Performing the wireless transmissions may involve that the wireless communication device sends at least some of the wireless transmissions and/or that the wireless communication device receives at least some of the wireless transmissions.

The beamforming processing configured at step 820 may involve: for the first polarization, weighting antenna signals each corresponding to a respective one of the multiple antenna elements by a first beamforming vector; for the second polarization, weighting antenna signals each corresponding to a respective one of the multiple antenna elements by a second beamforming vector, and for the third polarization, weighting antenna signals each corresponding to a respective one of the multiple antenna elements by a third beamforming vector. Here, the first beamforming vector, the second beamforming vector, and the third beamforming vector result in spatial variations of an array factor of the antenna array which are reduced as compared to performing the beamforming processing of the signals without weighting the signals. The first beamforming vector, the second beamforming vector, and the third beamforming vector may correspond to those determined at step 810. Configuring the beamforming processing may involve providing the first beamforming vector, the second beamforming vector, and the third beamforming vector to the wireless communication device. In other scenarios, the first beamforming vector, the second beamforming vector, and the third beamforming vector may be pre-configured in the wireless communication device, e.g., based on manufacturer settings or based on operator settings, and the configuration of step 820 may involve instructing the wireless communication device to apply the pre-configured first beamforming vector, second beamforming vector, and third beamforming vector.

In some scenarios, step 820 may involve configuring the wireless communication device with multiple modes of operation. In particular, the wireless communication device may be configured with a first mode of operation, in which the wireless communication device performs one or more of the wireless transmissions based on the beamforming processing with the first beamforming vector, the second beamforming vector, and the third beamforming vector, and with a second mode of operation, in which the wireless communication device performs one or more of the wireless transmissions based on performing the beamforming processing by: for the first polarization, weighting antenna signals each corresponding to a respective one of the multiple antenna elements by a first targeted beamforming vector, for the second polarization, weighting antenna signals each corresponding to a respective one of the multiple antenna elements by a second targeted beamforming vector, and for the third polarization, weighting antenna signals each corresponding to a respective one of the multiple antenna elements by a third targeted beamforming vector. Here, the first targeted beamforming vector, the second targeted beamforming vector, and the third targeted beamforming vector may be adaptively determined to define one or more directional beams for targeting one or more further wireless communication devices.

Figure 9:
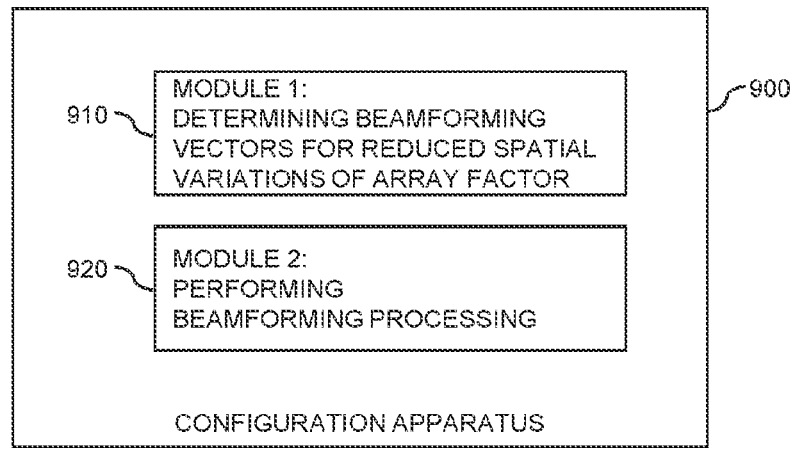
FIG. 9 shows an exemplary block diagram for illustrating functionalities of a configuration apparatus implementing functionalities corresponding to the method of FIG. 8.

FIG. 9 shows a block diagram for illustrating functionalities of a configuration apparatus 900 which operates according to the method of FIG. 8. The configuration apparatus 900 may for example correspond to be part of any of the above-mentioned access node 100 or management node 160, or may be part of equipment used for manufacturing of wireless communication devices. As illustrated, the configuration apparatus 900 may be provided with a module 910 configured to determine beamforming vectors, such as explained in connection with step 810. Further, the configuration apparatus 900 may be provided with a module 920 configured to configure beamforming processing of a wireless communication device, such as explained in connection with step 820.

It is noted that the configuration apparatus 900 may include further modules for implementing other functionalities, such as known functionalities of a an access node or management node for a wireless communication network, or known functionalities of equipment for manufacturing a wireless communication device. Further, it is noted that the modules of the configuration apparatus 900 do not necessarily represent a hardware structure of the configuration apparatus 900, but may also correspond to functional elements, e.g., implemented by hardware, software, or a combination thereof.

Figure 10:
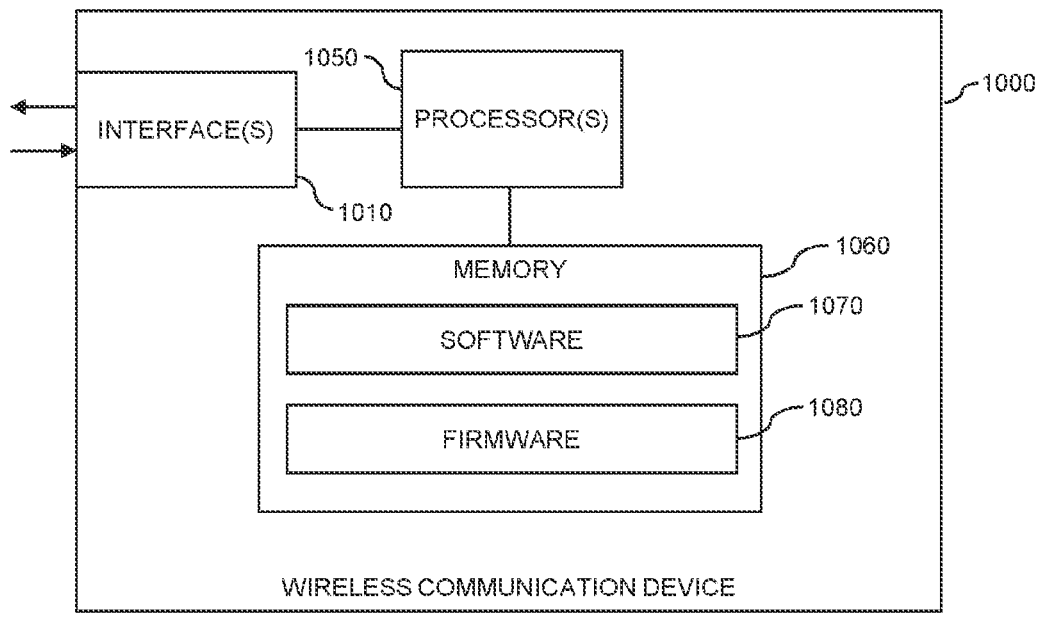
FIG. 10 schematically illustrates structures of a wireless communication device according to an embodiment of the invention.

FIG. 10 illustrates a processor-based implementation of a wireless communication device 1000 which may be used for implementing the above-described concepts. For example, the structures as illustrated in FIG. 10 may be used for implementing the concepts in any of the above-mentioned entities 10, 100, 310, or 320.

As illustrated, the wireless communication device 1000 includes one or more interfaces 1010. These interfaces 1010 may include a radio interface for performing the wireless transmissions. Such radio interface may be based on multiple antenna elements each having a tri-polarized configuration, e.g., as explained in connection with FIG. 3. Further, such radio interface could be based on the LTE technology, the NR technology, or a 6G technology.

Further, the wireless communication device 1000 may include one or more processors 1050 coupled to the interface(s) 1010 and a memory 1060 coupled to the processor(s) 1050. By way of example, the interface(s) 1010, the processor(s) 1050, and the memory 1060 could be coupled by one or more internal bus systems of the wireless communication device 1000. The memory 1060 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1060 may include software 1070 and/or firmware 1080. The memory 1060 may include suitably configured program code to be executed by the processor(s) 1050 so as to implement the above-described functionalities of a device for controlling wireless transmissions, such as explained in connection with FIGS. 6 and 7.

It is to be understood that the structures as illustrated in FIG. 10 are merely schematic and that the wireless communication device 1000 may actually include further components which, for the sake of clarity, have not been illustrated, e.g., further interfaces or processors. Also, it is to be understood that the memory 1060 may include further program code for implementing known functionalities of a transmitter device or receiver device, e.g., known functionalities of UE or of an access node. According to some embodiments, also a computer program may be provided for implementing functionalities of the wireless communication device 1000, e.g., in the form of a physical medium storing the program code and/or other data to be stored in the memory 1060 or by making the program code available for download or by streaming.

Figure 11:
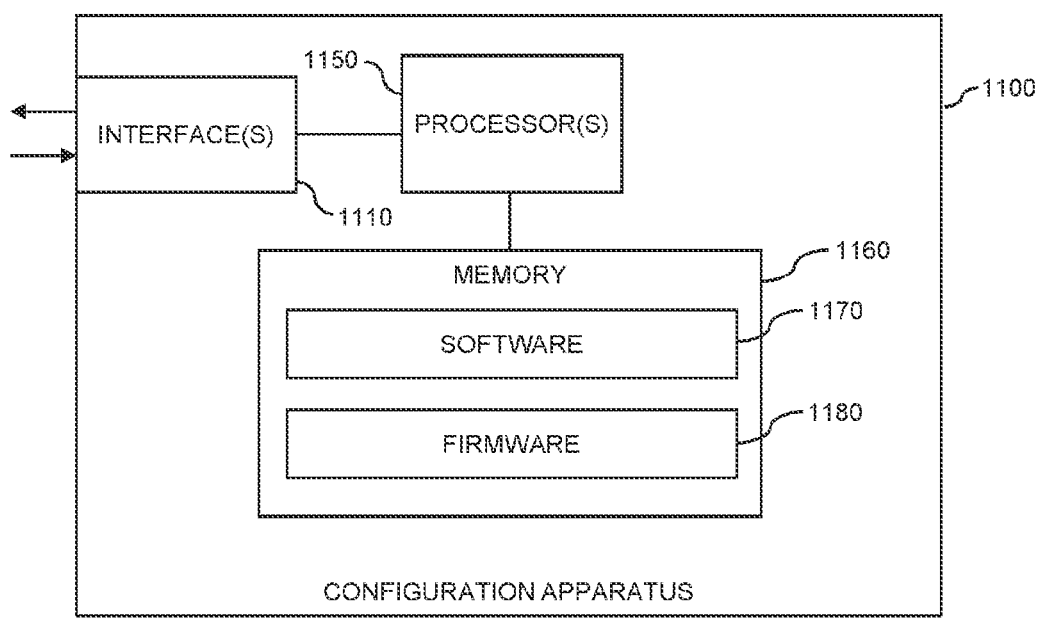
FIG. 11 schematically illustrates structures of a configuration apparatus according to an embodiment of the invention.

FIG. 11 illustrates a processor-based implementation of a configuration apparatus 1100 which may be used for implementing the above-described concepts. For example, the structures as illustrated in FIG. 11 may be used for implementing the concepts in any of the above-mentioned entities 100 or 160, or in equipment for manufacturing wireless communication devices.

As illustrated, the configuration apparatus 1100 includes one or more interfaces 1110. These interfaces 1110 may include a configuration interface with respect to a wireless communication device. In some cases, such configuration interface may also be implemented via a radio interface of the wireless communication device. Such radio interface could be based on the LTE technology, the NR technology, or a 6G technology.

Further, the configuration apparatus 1100 may include one or more processors 1150 coupled to the interface(s) 1110 and a memory 1160 coupled to the processor(s) 1150. By way of example, the interface(s) 1110, the processor(s) 1150, and the memory 1160 could be coupled by one or more internal bus systems of the configuration apparatus 1100. The memory 1160 may include a ROM, e.g., a flash ROM, a RAM, e.g., a DRAM or SRAM, a mass storage, e.g., a hard disk or solid state disk, or the like. As illustrated, the memory 1160 may include software 1170 and/or firmware 1180. The memory 1160 may include suitably configured program code to be executed by the processor(s) 1150 so as to implement the above-described functionalities of a configuration apparatus 1100, such as explained in connection with FIGS. 8 and 9.

It is to be understood that the structures as illustrated in FIG. 11 are merely schematic and that the configuration apparatus 1100 may actually include further components which, for the sake of clarity, have not been illustrated, e.g., further interfaces or processors. Also, it is to be understood that the memory 1160 may include further program code for implementing known functionalities of an access node, of a management node, or of manufacturer equipment. According to some embodiments, also a computer program may be provided for implementing functionalities of the configuration apparatus 1100, e.g., in the form of a physical medium storing the program code and/or other data to be stored in the memory 1160 or by making the program code available for download or by streaming.

As can be seen, the concepts as described above may be used for achieving reduced sensitivity to orientation misalignment between tri-polarized antenna arrays. This may help to provide increased link performance for many relative orientations and positions of antenna arrays. In the illustrated concepts, the beamforming processing may be performed purely in the phase domain, without touching the amplitudes of the weights. This may in turn help to avoid power loss and facilitate implementation by means of analog and hybrid beamforming.

It is to be understood that the examples and embodiments as explained above are merely illustrative and susceptible to various modifications. For example, the illustrated concepts may be applied in connection with various kinds of radio technologies, without limitation to the LTE technology or NR technology. Further, the concepts may be applied with respect to various types of transmitter devices and receiver devices. Further, the concepts may be applied with respect to various numbers of antenna elements in the transmitter device and/or various numbers of antenna elements in the receiver device. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

The invention claimed is:

1. A method of controlling wireless transmissions, the method comprising:
    a wireless communication device performing wireless transmissions via an antenna array of the wireless communication device, the antenna array comprising multiple antenna elements with a first polarization, a second polarization, and a third polarization; and
    for at least some of the wireless transmissions, the wireless communication device performing beamforming processing by:
    for the first polarization, weighting antenna signals each corresponding to a respective one of the multiple antenna elements by a first beamforming vector;
    for the second polarization, weighting antenna signals each corresponding to a respective one of the multiple antenna elements by a second beamforming vector, and
    for the third polarization, weighting antenna signals each corresponding to a respective one of the multiple antenna elements by a third beamforming vector, wherein
    the first beamforming vector, the second beamforming vector, and the third beamforming vector result in spatial variations of an array factor of the antenna array which are reduced as compared to performing the beamforming processing of the signals without weighting the signals.

2. The method of claim 1, wherein the first beamforming vector, the second beamforming vector, and the third beamforming vector are determined by optimization based on, for each of the first polarization, second polarization, and third polarization, autocorrelation of antenna signals each corresponding to a respective one of the multiple antenna elements.

3. The method of claim 2, wherein the first beamforming vector, the second beamforming vector, and the third beamforming vector are determined by optimization with the aim that a sum of an aperiodic autocorrelation function of the antenna signals for the first polarization when applying the first beamforming vector, an aperiodic autocorrelation function of the antenna signals for the second polarization and when applying the second beamforming vector, and an aperiodic autocorrelation function of the antenna signals for the third polarization when applying the third beamforming vector becomes equal to a Dirac delta function.

4. The method of claim 1, wherein the wireless communication device determines the first beamforming vector, the second beamforming vector, and the third beamforming vector.

5. The method of claim 1, wherein the first beamforming vector, the second beamforming vector, and the third beamforming vector are pre-configured in the wireless communication device.

6. The method of claim 1, comprising:
in a first mode of operation, the wireless communication device performing one or more of the wireless transmissions based on the beamforming processing with the first beamforming vector, the second beamforming vector, and the third beamforming vector; and
in a second mode of operation, the wireless communication device performing one or more of the wireless transmissions based on performing the beamforming processing by:
for the first polarization, weighting antenna signals each corresponding to a respective one of the multiple antenna elements by a first targeted beamforming vector;
for the second polarization, weighting antenna signals each corresponding to a respective one of the multiple antenna elements by a second targeted beamforming vector, and
for the third polarization, weighting antenna signals each corresponding to a respective one of the multiple antenna elements by a third targeted beamforming vector, wherein
the first targeted beamforming vector, the second targeted beamforming vector, and the third targeted beamforming vector are adaptively determined to define one or more directional beams for targeting one or more further wireless communication devices.

7. The method of claim 1, wherein the first polarization, the second polarization, and the third polarization are orthogonal linear polarizations.

8. The method claim 1, wherein
each antenna element comprises at least one electric dipole antenna element,
each antenna element comprises at least one magnetic loop antenna element, or
each antenna element comprises a combination of at least one electric dipole element and at least one magnetic loop element.

9. A non-transitory computer readable storage medium storing a computer program or computer program product comprising program code to be executed by at least one processor of a wireless communication device, wherein execution of the program code causes the wireless communication device to perform the method of claim 1.

10. A method of configuring a wireless communication device, the method comprising:
configuring a wireless communication device for performing wireless transmissions via an antenna array of the wireless communication device, the antenna array comprising multiple antenna elements with a first polarization, a second polarization, and a third polarization; and
configuring the wireless communication device to, for at least some of the wireless transmissions, perform beamforming processing by:
for the first polarization, weighting antenna signals each corresponding to a respective one of the multiple antenna elements by a first beamforming vector;
for the second polarization, weighting antenna signals each corresponding to a respective one of the multiple antenna elements by a second beamforming vector, and
for the third polarization, weighting antenna signals each corresponding to a respective one of the multiple antenna elements by a third beamforming vector,
wherein the first beamforming vector, the second beamforming vector, and the third beamforming vector result in spatial variations of an array factor of the antenna array which are reduced as compared to performing the beamforming processing of the signals without weighting the signals.

11. The method of claim 10, wherein the first beamforming vector, the second beamforming vector, and the third beamforming vector are determined by optimization based on, for each of the first polarization, second polarization, and third polarization, autocorrelation of antenna signals each corresponding to a respective one of the multiple antenna elements.

12. The method of claim 11, wherein the first beamforming vector, the second beamforming vector, and the third beamforming vector are determined by optimization with the aim that a sum of an aperiodic autocorrelation function of the antenna signals for the first polarization when applying the first beamforming vector, an aperiodic autocorrelation function of the antenna signals for the second polarization and when applying the second beamforming vector, and an aperiodic autocorrelation function of the antenna signals for the third polarization when applying the third beamforming vector becomes equal to a Dirac delta function.

13. The method of claim 10, wherein said configuring comprises providing the first beamforming vector, the second beamforming vector, and the third beamforming vector to the wireless communication device.

14. The method of claim 10, comprising configuring the wireless device with a first mode of operation and a second mode of operation, wherein:
in the first mode of operation, the wireless communication device performs one or more of the wireless transmissions based on the beamforming processing with the first beamforming vector, the second beamforming vector, and the third beamforming vector; and
in a second mode of operation, the wireless communication device performs one or more of the wireless transmissions based on performing the beamforming processing by:
for the first polarization, weighting antenna signals each corresponding to a respective one of the multiple antenna elements by a first targeted beamforming vector;
for the second polarization, weighting antenna signals each corresponding to a respective one of the multiple antenna elements by a second targeted beamforming vector, and
for the third polarization, weighting antenna signals each corresponding to a respective one of the multiple antenna elements by a third targeted beamforming vector, wherein
the first targeted beamforming vector, the second targeted beamforming vector, and the third targeted beamforming vector are adaptively determined by the wireless communication device to define one or more directional beams for targeting one or more further wireless communication devices.

15. The method of claim 10, wherein the first polarization, the second polarization, and the third polarization are orthogonal linear polarizations.

16. A non-transitory computer readable storage medium storing a computer program or computer program product comprising program code to be executed by at least one processor of an apparatus for configuration of a wireless communication device, wherein execution of the program code causes the apparatus to perform the method of claim 10.

17. A wireless communication device (WCD) the WCD comprising:
   processing circuitry, and
   a memory containing program code executable by the processing circuitry, wherein execution of the program code by the processing circuitry causes the WCD to:
   perform wireless transmissions via an antenna array of the wireless communication device, the antenna array comprising multiple antenna elements with a first polarization, a second polarization, and a third polarization; and
   for at least some of the wireless transmissions, perform beamforming processing by:
   for the first polarization, weighting antenna signals each corresponding to a respective one of the multiple antenna elements by a first beamforming vector;
   for the second polarization, weighting antenna signals each corresponding to a respective one of the multiple antenna elements by a second beamforming vector, and
   for the third polarization, weighting antenna signals each corresponding to a respective one of the multiple antenna elements by a third beamforming vector, wherein
   the first beamforming vector, the second beamforming vector, and the third beamforming vector result in spatial variations of an array factor of the antenna array which are reduced as compared to performing the beamforming processing of the signals without weighting the signals.

18. The wireless communication device of claim 17, wherein the first beamforming vector, the second beamforming vector, and the third beamforming vector are determined by optimization based on, for each of the first polarization, second polarization, and third polarization, autocorrelation of antenna signals each corresponding to a respective one of the multiple antenna elements.

19. An apparatus for configuring a wireless communication device, the apparatus comprising:
   processing circuitry, and
   a memory containing program code executable by the processing circuitry, wherein execution of the program code by the processing circuitry causes the apparatus to:
   configure the wireless communication device for performing wireless transmissions via an antenna array of the wireless communication device, the antenna array comprising multiple antenna elements with a first polarization, a second polarization, and a third polarization; and
   configure the wireless communication device to, for at least some of the wireless transmissions, perform beamforming processing by:
   for the first polarization, weighting antenna signals each corresponding to a respective one of the multiple antenna elements by a first beamforming vector;
   for the second polarization, weighting antenna signals each corresponding to a respective one of the multiple antenna elements by a second beamforming vector, and
   for the third polarization, weighting antenna signals each corresponding to a respective one of the multiple antenna elements by a third beamforming vector, wherein the first beamforming vector, the second beamforming vector, and the third beamforming vector result in spatial variations of an array factor of the antenna array which are reduced as compared to performing the beamforming processing of the signals without weighting the signals.

20. The apparatus of claim 19, wherein the apparatus is further configured to provide the first beamforming vector, the second beamforming vector, and the third beamforming vector to the wireless communication device.

* * * * *